US012559403B2

(12) United States Patent
Cabodi et al.

(10) Patent No.: US 12,559,403 B2
(45) Date of Patent: Feb. 24, 2026

(54) REFRACTORY PRODUCT HAVING A HIGH CONTENT OF ZIRCONIA

(71) Applicant: SAINT-GOBAIN CENTRE DE RECHERCHES ET D'ETUDES EUROPEEN, Courbevoie (FR)

(72) Inventors: Isabelle Cabodi, Cavaillon (FR); Pierrick Fabien Vespa, Aix en Provence (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 1159 days.

(21) Appl. No.: 17/429,525

(22) PCT Filed: Feb. 11, 2020

(86) PCT No.: PCT/EP2020/053472
§ 371 (c)(1),
(2) Date: Aug. 9, 2021

(87) PCT Pub. No.: WO2020/165170
PCT Pub. Date: Aug. 20, 2020

(65) Prior Publication Data
US 2022/0106213 A1      Apr. 7, 2022

(30) Foreign Application Priority Data
Feb. 11, 2019    (FR) ...................................... 1901334

(51) Int. Cl.
*C03B 5/43*        (2006.01)
*C04B 35/48*        (2006.01)
(Continued)

(52) U.S. Cl.
CPC .............. *C03B 5/43* (2013.01); *C04B 35/481* (2013.01); *C04B 35/484* (2013.01);
(Continued)

(58) Field of Classification Search
CPC ....... C03B 5/43; C04B 35/481; C04B 35/484; C04B 35/657; C04B 2235/3206;
(Continued)

(56) References Cited

U.S. PATENT DOCUMENTS

2012/0036895 A1      2/2012  Sato
2013/0255316 A1*    10/2013  Gaubil .................. C04B 35/645
                                                                        65/374.13
2018/0237344 A1*    8/2018  Cabodi .................. C04B 35/634

FOREIGN PATENT DOCUMENTS

FR          1208577  A       2/1960
FR          2897862  A1 *   8/2007   ............... C03B 5/43
(Continued)

OTHER PUBLICATIONS

FR2897862 machine translation (Year: 2007).*
(Continued)

*Primary Examiner* — Cameron K Miller
(74) *Attorney, Agent, or Firm* — Ronald M. Kachmarik; Cooper Legal Group LLC

(57)          ABSTRACT

Fused cast refractory product including, as weight percentages on the basis of the oxides and for a total of 100%: $ZrO_2$: balance to 100%, $Hf_2O$: <5%, $SiO_2$: 8.1% to 12.0%, $B_2O_3$: 0.20% to 0.90%, $Na_2O+K_2O$: 0.40% to 0.80%, $Al_2O_3$: 0.3% to 2.0%, $Y_2O_3$: <2.0%, $Fe_2O_3+TiO_2$: <0.6%, and other species: <1.5%.

11 Claims, 1 Drawing Sheet

(51) Int. Cl.
C04B 35/484 (2006.01)
C04B 35/657 (2006.01)

(52) U.S. Cl.
CPC .... C04B 35/657 (2013.01); *C04B 2235/3201* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3225* (2013.01); *C04B 2235/3232* (2013.01); *C04B 2235/3248* (2013.01); *C04B 2235/3272* (2013.01); *C04B 2235/3409* (2013.01); *C04B 2235/3418* (2013.01); *C04B 2235/447* (2013.01); *C04B 2235/6562* (2013.01); *C04B 2235/6565* (2013.01); *C04B 2235/72* (2013.01)

(58) Field of Classification Search
CPC .... C04B 2235/3213; C04B 2235/3215; C04B 2235/3232; C04B 2235/6565
See application file for complete search history.

(56) References Cited

FOREIGN PATENT DOCUMENTS

| | | |
|---|---|---|
| FR | 2953825 A1 | 6/2011 |
| WO | 2015025901 A1 | 2/2015 |

OTHER PUBLICATIONS

International Search Report corresponding to International Application No. PCT/EP2020/053472, dated Mar. 19, 2020, 5 pages.
Gerard Duvierre, et al., "Fused Cast AZS Adapted for Superstructure Applications in Today's Glass Furnaces", Ceramic Engineering and Science Proceedings 16 [2] , pp. 84-95, 1995.
Ruth Engel, "Refractory Challenges in Furnaces", Glass International, Feb. 2019.

* cited by examiner

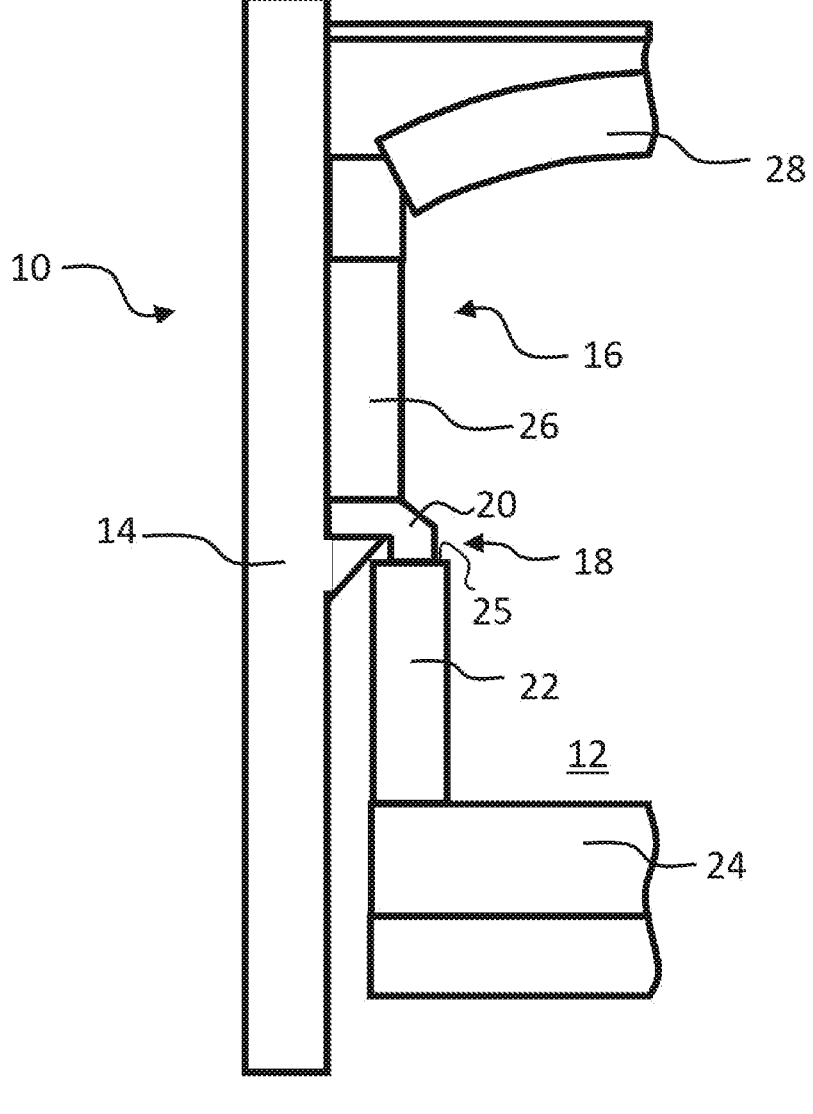

REFRACTORY PRODUCT HAVING A HIGH CONTENT OF ZIRCONIA

TECHNICAL FIELD

The invention relates to a fused refractory product having a high zirconia content and to a glass melting furnace comprising such a product.

PRIOR ART

Glass melting furnaces generally comprise a very large number of refractory products, positioned at various locations depending on their properties. For each part of the furnace, the product chosen will be the one that does not give rise to defects that make the glass unusable (which would reduce the production yields) and that is resistant for a sufficiently long time to give the furnace a satisfactory service life.

FIG. 1 schematically represents a half cross section of a glass melting furnace 10. Particularly discernible are a tank 12, a metallic structure 14 and a superstructure 16.

The tank 12, intended to contain the molten glass, comprises a vertical side wall 22 and a bottom 24. The side wall 22 conventionally consists of lateral tank blocks that extend over the entire height of the tank, up to an upper edge 25.

The superstructure 16 conventionally comprises, at its base, an intermediate layer 18 via which it rests on the metallic structure, a side wall 26 resting on the intermediate layer and a crown 28. Burners, not shown, are positioned in the side wall 26 and operate alternately. The intermediate layer 18 comprises, and preferably consists of, tuckstones 20.

The superstructure parts are subjected to various thermo-mechanical stresses. Firstly, a high thermal gradient between the inside of the furnace (at temperatures of around 1500° C.) and the cooled exterior (at temperatures close to ambient temperature, generally owing to cooling by air blowing). This thermal gradient results in a strain of the material in proportion to its thermal expansion, and this therefore generates stresses (product of this strain and the elastic modulus of the material). These parts also undergo thermal shocks, owing to malfunctions of the cooling or of the burner systems of the furnace. Thus, the superstructure parts must withstand cracking despite very high thermomechanical stresses.

The superstructure must also withstand corrosion by the corrosive fumes of the furnace and the condensates.

In order to withstand these stresses, the superstructure consists of blocks made of a refractory product.

Among refractory products, a distinction is made between fused blocks and sintered blocks.

Unlike sintered blocks, fused blocks usually comprise an intergranular glassy phase connecting crystalline grains. The problems encountered with sintered blocks and with fused blocks, and the technical solutions adopted for solving them, are therefore generally different. A composition developed for manufacturing a sintered block cannot therefore a priori be used as such for manufacturing a fused block, and vice versa.

Fused blocks, often referred to as "electrofused" or "fused cast" blocks, are obtained by melting a mixture of suitable raw materials in an electric arc furnace or by any other suitable technique. The molten material is then convention-ally cast in a mold, then solidified. Generally, the product obtained then undergoes a controlled cooling cycle in order to be brought to ambient temperature without fracturing. This operation is referred to as "annealing" by a person skilled in the art.

Currently, to form the superstructures, use is mainly made of fused blocks, in particular products of alumina-zirconia-silica type (abbreviated to AZS) containing from 30% to 45% of zirconia.

Furthermore, fused blocks having a very high zirconia content (VHZC) are known which generally comprise more than 80%, or more than 85% by weight of zirconia. They are renowned for their very high corrosion resistance and their ability to not color the glass produced and to not generate defects in the latter.

EP 403 387 describes fused cast products having a high zirconia content that contain, as weight percentages, 4% to 5% of $SiO_2$, around 1% of $Al_2O_3$, 0.3% of sodium oxide, and less than 0.05% of $P_2O_5$.

FR 2 701 022 describes fused cast products having a high zirconia content that contain, as weight percentages, 0.05% to 1.0% of $P_2O_5$ and 0.05% to 1.0% of boron oxide $B_2O_3$.

FR 2 723 583 describes fused cast products having a high zirconia content that contain, as weight percentages, 3% to 8% of $SiO_2$, 0.1% to 2.0% of $Al_2O_3$, 0.05% to 3.0% of boron oxide $B_2O_3$, 0.05% to 3% of $BaO+SrO+MgO$, 0.05% to 0.6% of $Na_2O+K_2O$ and less than 0.3% of $Fe_2O_3+TiO_2$.

Fused blocks having a very high zirconia content, such as ER 1195 produced and sold by the company SEFPRO, are today widely used in glass melting furnaces. However, their high cost and their properties may limit their use, which is essentially concentrated on the blocks in contact with the glass, in particular in the most stressed zones of the tank.

There is a need for refractory products having a corrosion resistance and a breaking strength under mechanical stresses that make them suitable for use in a superstructure of glass melting furnaces.

The present invention aims to satisfy this need.

DISCLOSURE OF THE INVENTION

Summary of the Invention

The invention provides a fused cast refractory product comprising, as weight percentages on the basis of the oxides and for a total of 100%:

| | |
|---|---|
| $ZrO_2$: | balance to 100% |
| $Hf_2O$: | <5% |
| $SiO_2$: | 8.1% to 12.0% |
| $B_2O_3$: | 0.20% to 0.90 % |
| $Na_2O + K_2O$: | 0.40% to 0.80% |
| $Al_2O_3$: | 0.3% to 2.0% |
| $Y_2O_3$: | <2.0% |
| $Fe_2O_3 + TiO_2$: | <0.6% |
| other species: | <1.5%. |

As will be seen in greater detail in the remainder of the description, such a composition gives a fused product remarkable mechanical performance in the environment of a superstructure of a glass melting furnace. Tests have also demonstrated a low exudation. A product according to the invention is therefore perfectly suitable for use in a super-structure.

A product according to the invention may also have one or more of the following optional characteristics, including when it is in accordance with the particular embodiments described below and when these optional characteristics are not incompatible with said particular embodiments:

the total porosity of the product is less than 10%, or indeed less than 5%;

preferably, the oxides represent more than 90%, more than 95%, more than 99%, or indeed substantially 100% of the weight of the product;

the weight content of $ZrO_2 + HfO_2$ is less than 92.0%, or indeed less than 90.0%, or indeed less than 89.0% and/or greater than 83.0%, or indeed greater than 84.0%, or greater than 85.0%;

the weight content of $SiO_2$ is greater than 8.4%, or indeed greater than 8.5%, or indeed greater than 8.6%, or indeed greater than 8.8%, or indeed greater than 9.1% and/or less than 11.5%, or indeed less than 11.0%, or indeed less than 10.8%, or indeed less than 10.6%;

the sum of the weight contents of boron oxide $B_2O_3$, of sodium oxide $Na_2O$ and of potassium oxide $K_2O$ is greater than 0.65%, or indeed greater than 0.70%, or indeed greater than 0.75% and/or less than 1.20%, or indeed less than 1.10%, or indeed less than 1.00%;

the weight content of boron oxide $B_2O_3$ is greater than 0.25%, or indeed greater than 0.30%, or indeed greater than 0.35%, or indeed greater than 0.40% and/or less than 0.85%, less than 0.80%, less than 0.75%, less than 0.70%, less than 0.60%, or indeed less than 0.55%;

the sum of the weight contents of sodium oxide $Na_2O$ and of potassium oxide $K_2O$ is greater than 0.45% and/or less than 0.75%, less than 0.65%;

the weight content of $Na_2O$ is greater than 0.40%, or indeed greater than 0.45%, or indeed greater than 0.50% and/or less than 0.80%, or indeed less than 0.70%, or indeed less than 0.60%;

$K_2O$ is present as an impurity or partially replaces $Na_2O$, and the weight content of $K_2O$ is less than 0.70%, or indeed less than 0.60%, or indeed less than 0.50%, or indeed less than 0.40%, or indeed less than 0.30%;

the weight content of $Al_2O_3$ is less than 1.9%, or indeed less than 1.8%, or less than 1.7% and/or greater than 0.5%, or indeed greater than 0.6%, or indeed greater than 0.7%, or indeed greater than 0.9%, greater than 1.0%, or indeed greater than 1.1%, or indeed greater than 1.2%;

the weight content of $Y_2O_3$ is greater than 0.5%, or indeed greater than 0.7%, or indeed greater than 0.9%, or indeed greater than 1.0%, or indeed greater than 1.1%, and/or less than 1.9%, or indeed less than 1.8%, or indeed less than 1.7%, or indeed less than 1.6%;

the sum of the weight contents of iron oxide and of titanium oxide, $Fe_2O_3 + TiO_2$, is less than 0.4%, preferably less than 0.3%, preferably less than 0.2%;

the total weight content of the "other species" is less than 1.2%, or indeed less than 1.0%, or indeed less than 0.6%, or indeed less than 0.5%, or indeed less than 0.4%;

the "other species" consist only of impurities;

the weight content of any "other species" is less than 0.40%, or indeed less than 0.30%, or indeed less than 0.20%;

the sum of the weight contents of calcium oxide CaO, of barium oxide BaO, of strontium oxide SrO and of magnesium oxide MgO is less than 0.60%, less than 0.50%, less than 0.40%, or indeed less than 0.30%;

the weight content of CaO is less than 0.60%, or indeed less than 0.40%, or indeed less than 0.30%;

the weight content of BaO is less than 0.60%, or indeed less than 0.40%, or indeed less than 0.30%, less than 0.20%, less than 0.10%, less than 0.05% or substantially zero;

the weight content of SrO is less than 0.60%, or indeed less than 0.40%, or indeed less than 0.30%, less than 0.20%, less than 0.10%, less than 0.05% or substantially zero;

the weight content of MgO is less than 0.60%, or indeed less than 0.40%, or indeed less than 0.30%;

the weight content of $Ta_2O_5$ is less than 0.20%, less than 0.10%, less than 0.05% or substantially zero;

the weight content of $Nb_2O_5$ is less than 0.20%, less than 0.10%, less than 0.05% or substantially zero.

According to one particular embodiment, the invention provides a fused cast refractory product comprising, as weight percentages on the basis of the oxides:

| | |
|---|---|
| $SiO_2$: | 8.5% to 11.0% |
| $B_2O_3$: | 0.30% to 0.80% |
| $Na_2O + K_2O$: | 0.40% to 0.70% |
| $Al_2O_3$: | 0.6% to 2.0%. |

According to one particular embodiment, the invention provides a fused cast refractory product comprising, as weight percentages on the basis of the oxides:

| | |
|---|---|
| $SiO_2$: | 8.5% to 10.8% |
| $B_2O_3$: | 0.30% to 0.70% |
| $Na_2O + K_2O$: | 0.40% to 0.70% |
| $Al_2O_3$: | 1.0% to 1.8%. |

According to one particular embodiment, the invention provides a fused cast refractory product comprising, as weight percentages on the basis of the oxides:

| | |
|---|---|
| $SiO_2$: | 9.1% to 11.0% |
| $B_2O_3$: | 0.30% to 0.70% |
| $Na_2O + K_2O$: | 0.40% to 0.70% |
| $Al_2O_3$: | 1.1% to 1.8%. |

The invention also relates to a process of manufacturing a refractory product according to the invention, comprising the following successive steps:

a. mixing raw materials so as to form a feedstock, b. melting said feedstock until a molten material is obtained, c. casting and solidifying said molten material, by cooling, so as to obtain a refractory product, this process being noteworthy in that said raw materials are chosen so that said refractory product is in accordance with the invention.

Preferably, the oxides for which a minimum content is necessary, or precursors of these oxides, are added systematically and methodically. Preferably, the contents of these oxides in sources of other oxides where they are present as impurities are taken into account.

Preferably, the cooling is controlled, preferably so as to be carried out at a rate of less than 20° C. per hour, preferably at the rate of around 10° C. per hour.

The invention also relates to a glass melting furnace comprising a refractory product according to the invention, or to a refractory product manufactured or capable of having been manufactured following a process according to the invention, in particular in a region not intended to be in contact with molten glass, in particular in the superstructure, in particular in the crown.

Definitions

A product is conventionally said to be "fused" when it is obtained by a process that carries out a melting of a feedstock until a molten material is obtained, then a solidification of this material by cooling.

A block is an object, all the dimensions of which are greater than 10 mm, preferably greater than 50 mm, preferably greater than 100 mm, and which, unlike a layer, is obtained by a process comprising operations of molding and removal from the mold. A block may for example have a general parallelepipedal shape or else a specific shape adapted to the use thereof.

Unless otherwise mentioned, all the contents of oxides in a product according to the invention are weight percentages on the basis of the oxides. A weight content of an oxide of a metallic element relates to the total content of this element expressed in the form of the most stable oxide, according to the customary convention of the industry.

$HfO_2$ cannot be chemically dissociated from $ZrO_2$. However, according to the present invention, $HfO_2$ is not intentionally added to the feedstock. $HfO_2$ therefore denotes only traces of hafnium oxide, this oxide always being naturally present in sources of zirconium oxide at contents generally of less than 5%, generally less than 2%. In a block according to the invention, the weight content of $HfO_2$ is less than 5%, preferably less than 3%, preferably less than 2%. For the sake of clarity, it is possible to denote, without distinction, the total content of zirconium oxide and of traces of hafnium oxide by "$ZrO_2$" or by "$ZrO_2+HfO_2$". $HfO_2$ is not therefore included in the "other species".

The term "impurities" is understood to mean the inevitable constituents introduced with the raw materials or resulting from reactions with these constituents. The impurities are not necessary constituents but are merely tolerated. For example, compounds belonging to the group of oxides, nitrides, oxynitrides, carbides, oxycarbides, carbonitrides and iron, titanium, vanadium and chromium metallic species are impurities.

BRIEF DESCRIPTION OF THE DRAWINGS

Other features and advantages of the invention will become more apparent on reading the detailed description which follows and on examining the appended drawing in which FIG. 1, described in the preamble, schematically represents a half cross section of a glass melting furnace.

DETAILED DESCRIPTION

In the fused cast products according to the invention, the high content of $ZrO_2$ makes it possible to meet the requirements of high corrosion resistance without generating defects that are detrimental to the quality of the glass.

The hafnium oxide, $HfO_2$, present in the product according to the invention is the hafnium oxide naturally present in the sources of $ZrO_2$. Its content in a product according to the invention is therefore less than 5%, generally less than 2%.

The presence of $SiO_2$ enables in particular the formation of an intergranular glassy phase capable of effectively accommodating the deformations of the zirconia backbone. On the other hand, the addition of $SiO_2$ should not exceed 12% since this addition is carried out at the expense of the zirconia content and may therefore be detrimental to the corrosion resistance.

The presence of $Al_2O_3$ is in particular useful for the formation of a stable glassy phase and for the good castability of the molten material in the mold. However, the addition of $Al_2O_3$ should be limited since too high a weight content may lead to an instability of the glassy phase (formation of mullite crystals), in particular in the presence of boron oxide.

The simultaneous presence of $B_2O_3$ and of $Na_2O+K_2O$ makes it possible to improve the feasibility of the products. $B_2O_3$ has an effect an unfavorable effect on the formation of zircon in the product, which may result in a detrimental effect on the resistance to thermal cycling. The weight content of boron oxide $B_2O_3$ should therefore remain limited.

The weight content of $Na_2O+K_2O$ is preferably limited in order to limit the fly-off of the raw materials, in particular of the boron oxide. In a product according to the invention, it is considered that the oxides $Na_2O$ and $K_2O$ have similar effects.

In one embodiment, at least one of the contents of $Na_2O$ and of $K_2O$ is greater than 0.30%, preferably greater than 0.35%, preferably greater than 0.40%.

According to one particular embodiment:

| | |
|---|---|
| $SiO_2$: | 8.5% to 10.8% |
| $B_2O_3$: | 0.30% to 0.70% |
| $Al_2O_3$: | 1.0% to 1.8% | at least one of the contents of $Na_2O$ and of $K_2O$ being greater than 0.30%, preferably greater than 0.35%, preferably greater than 0.40%.

The weight content of yttrium oxide $Y_2O_3$ should be limited to preserve a good feasibility.

According to the invention, the weight content of $Fe_2O_3+TiO_2$ is less than 0.50%, preferably less than 0.30%. Preferably, the weight content of $P_2O_5$ is less than 0.05%. Specifically, these oxides are harmful and their content should be limited to traces introduced as impurities with the raw materials.

The "other species" are the oxide species which are not listed above, namely the species other than $ZrO_2$, $Hf_2O$, $SiO_2$, $Y_2O_3$, $B_2O_3$, $Al_2O_3$, $Na_2O$, $K_2O$, $TiO_2$ and $Fe_2O_3$. In one embodiment, the "other species" are limited to species whose presence is not particularly desired and which are generally present as impurities in the raw materials.

Preferably, the product according to the invention is in the form of a block.

The total privacy of the product according to the invention is less than 15%, or indeed less than 10%, or indeed less than 5%, or indeed less than 2%, or indeed less than 1%.

A product according to the invention may be conventionally manufactured according to the steps a. to c. described below:

a. mixing raw materials so as to form a feedstock, b. melting said feedstock until a molten material is obtained, c. solidifying said molten material, by cooling, so as to obtain a refractory product according to the invention.

In step a., the raw materials are chosen so as to guarantee the contents of oxides in the finished product.

In step b., the melting is preferably carried out by means of the combined action of a relatively long electric arc, which does not produce reduction, and of mixing that promotes the reoxidation of the products.

To minimize the formation of nodules of metallic appearance and to prevent the formation of slits or cracks in the final product, it is preferable to perform the melting under oxidizing conditions.

Preferentially, the long arc melting process described in French patent no. 1 208 577 and its additions nos. 75893 and 82310 is used.

This process consists in using an electric arc furnace in which the arc surges from between the feedstock and at least one electrode separate from this feedstock and in adjusting the length of the arc so that its reducing action is minimized, while at the same time maintaining an oxidizing atmosphere above the molten bath and by mixing said bath, either by the action of the arc itself, or by sparging into the bath an oxidizing gas (for example air or oxygen) or alternatively by adding to the bath substances that give off oxygen such as peroxides or nitrates.

In step c., the cooling is preferably performed at a rate of less than 20° C. per hour, preferably at a rate of about 10° C. per hour.

Any conventional process for manufacturing zirconia-based molten products intended for applications in glass melting furnaces may be used, provided that the composition of the feedstock makes it possible to obtain products having a composition in accordance with that of a product according to the invention.

In a product according to the invention, $ZrO_2$ is substantially entirely (typically for more than 95% of its weight) in the form of zirconia and $SiO_2$ and $Al_2O_3$ are substantially entirely (typically for more than 95% of their weights) in the glassy phase.

EXAMPLES

The following nonlimiting examples are given for the purpose of illustrating the invention.

In these examples, the following raw materials were used:
zirconia Q1 containing on average 99% of $ZrO_2+HfO_2$,
zircon sand containing on average 33% of $SiO_2$ and 66% of $ZrO_2+HfO_2$,
"Sable BE01 Bedouin" (BE01 Bedouin sand) silica containing on average 99% of $SiO_2$,
boron oxide containing on average 98% of $B_2O_3$,
sodium carbonate containing on average 99.5% of $Na_2CO_3$ as source of $Na_2O$,
alumina of AC34 type containing on average 99% of $Al_2O_3$,
yttrium oxide containing on average 99% of $Y_2O_3$.

The products were prepared according to the conventional arc furnace melting process, then cast in order to obtain blocks measuring 996 mm×203 mm×800 mm.

The chemical analysis of the products obtained is given in table 1; it is an average chemical analysis, given in weight percentages.

Resistance to the Thermomechanical Stresses

In order to study the ability of the products to withstand the thermomechanical stresses undergone by the blocks of superstructures, the inventors used Kingery's theory that connects the MOR/MOE ratio to the thermal shock resistance and Hasselman's theory which connects the energy of rupture to the thermal shock resistance. Furthermore, in linear elastic mechanics, the severity of the thermomechanical stresses is linked to the ratio between the modulus of rupture (MOR) and the modulus of elasticity (MOE). This ratio should be maximized, just like the energy of rupture, so that the products are resistant to cracking of thermomechanical origin. They are placed at 1000° C., which corresponds substantially to the temperature in the core of the block.

MOR Measurement

The modulus of rupture (MOR) is the maximum stress measured at 1000° C. in air for a sample with dimensions of $150×25×15$ mm$^3$ placed in a 3-point bending assembly set up with a distance of 120 mm between the two lower supports, the descent rate of the punch providing the upper support, halfway along the length of the sample, being equal to 0.5 mm/min. The value of the MOR is an average resulting from three successive measurements.

MOE Measurement

To measure the MOE, use is made of the same assembly as the one described for the MOR and of a displacement sensor to monitor the displacement of the deflection of the sample and to determine the MOE, that is to say the ratio between the stress and the elastic strain caused by this stress.

Energy of Rupture Measurement

The energy of rupture is measured at 1000° C., in air, on a sample with dimensions of $150×25×25$ mm$^3$, and having in the middle thereof a triangular notch having an angle of 60° and a base of 25 mm, placed in a 4-point bending assembly with a distance of 120 mm between two lower supports and a distance of 40 mm between the two upper supports. The descent rate of the upper supports is equal to 20 μm/min.

Corrosion Resistance Measurement

The corrosion resistance (CR) is measured by spraying a powder consisting of 50% of glass cullet, 15% of silica, 5% of dolomite and 30% of sodium carbonate, at a rate of 180 grams per hour for a total of 20 kilograms over 4 samples with dimensions of $110×100×30$ mm$^3$ rotated (6 rpm) in a furnace at 1450° C. The corroded volume is measured by a 3D scan and this volume is related to the initial volume.

Exudation Measurement

The resistance to exudation (REx) is measured, in air, on a sample with dimensions of $100×100×20$ mm$^3$. The sample undergoes cycles during which it is brought to 1550° C. at a rate of 100° C. per hour then held at 1550° C. for 6 hours. REx is the percentage of the volume of the silicate phase which has escaped from the sample after two cycles (which is found either on the sample (increase in the volume of the sample), or in the bottom of the crucible), relative to the initial volume of the sample. It is placed at 1550° C., which corresponds substantially to the temperature on the face of the block exposed to the interior of the tank.

Examples 1 and 2 correspond respectively to a conventional AZS product and to a conventional product having a high zirconia content.

The balance corresponds to the content of $ZrO_2+HfO_2$ and also to the impurities (the content of which is always less than 0.5% in these examples).

TABLE 1

|  | 1* | 2* | 3 | 4 |
|---|---|---|---|---|
| $SiO_2$ | 15.0 | 4.3 | 10.1 | 8.5 |
| $Al_2O_3$ | 50.9 | 1.2 | 1.7 | 1.6 |
| $Na_2O$ | 1.30 | 0.22 | 0.43 | 0.43 |
| $B_2O_3$ | <0.2 | <0.2 | 0.47 | 0.26 |
| $Y_2O_3$ | <0.2 | <0.2 | 0.51 | 1.19 |
| MOR/MOE | 1.80 | 1.40 | 3.16 | 2.13 |
| Energy of rupture | 0.4 kJ/m$^2$ | 0.5 kJ/m$^2$ | 4.0 kJ/m$^2$ | 1.2 kJ/m$^2$ |
| CR | 4.30% | ND | <0.5% | ND |
| REx | 4.78% | 0.77% | 0.71% | 0.16% |

*outside the invention

The tests show that, relative to the comparative product 2, the products 3 and 4 according to the invention have an improved resistance to thermomechanical stresses and a higher energy of rupture.

The degree of exudation of the products according to the invention is excellent.

As is clearly apparent, the invention therefore provides a product which has a remarkable mechanical performance in the environment of a glass melting furnace superstructure, and also a low exudation in operation.

Of course, the invention is not limited to the embodiments described and represented, which are provided solely by way of illustration.

The invention claimed is:

1. A glass melting furnace comprising a block positioned in the superstructure and made of a fused cast refractory product comprising, as weight percentages on the basis of the oxides and for a total of 100%:

| | |
|---|---|
| $ZrO_2$: | balance to 100% |
| $Hf_2O$: | <5% |
| $SiO_2$: | 8.1% to 12.0% |
| $B_2O_3$: | 0.20% to 0.90 % |
| $Na_2O + K_2O$: | 0.40% to 0.80% |
| $Al_2O_3$: | 0.3% to 2.0% |
| $Y_2O_3$: | <2.0% |
| $Fe_2O_3 + TiO_2$: | <0.6% |
| other species: | <1.5%. |

2. The glass melting furnace as claimed in claim 1, wherein, in the fused cast refractory product:

| |
|---|
| $83.0\% < ZrO_2 + HfO_2 < 92.0\%$; and/or |
| $8.4\% < SiO_2 < 11.5\%$; and/or |
| $0.25\% < B_2O_3 < 0.75\%$; and/or |
| $0.45\% < Na_2O + K_2O < 0.75\%$; and/or |
| $0.6\% < Al_2O_3 < 1.9\%$; and/or |
| $0.5\% < Y_2O_3 < 1.9\%$; and/or |
| $Fe_2O_3 + TiO_2 < 0.4\%$; and/or |
| other species < 1.2%. |

3. The glass melting furnace as claimed in claim 2, wherein, in the fused cast refractory product:

| |
|---|
| $84.0\% < ZrO_2 + HfO_2 < 90.0\%$; and/or |
| $8.8\% < SiO_2 < 11.0\%$; and/or |
| $0.40\% < B_2O_3 < 0.70\%$; and/or |
| $Na_2O + K_2O < 0.65\%$; and/or |
| $0.8\% < Al_2O_3 < 1.7\%$; and/or |
| $0.7\% < Y_2O_3 < 1.7\%$; and/or |
| $Fe_2O_3 + TiO_2 < 0.3\%$; and/or |
| other species < 1.0%. |

4. The glass melting furnace as claimed in claim 3, wherein, in the fused cast refractory product:

| |
|---|
| $85.0\% < ZrO_2 + HfO_2 < 90.0\%$; and/or |
| $9.1\% < SiO_2 < 10.8\%$; and/or |
| $B_2O_3 < 0.60\%$; and/or |
| $0.9\% < Al_2O_3$; and/or |
| $1.0\% < Y_2O_3 < 1.6\%$; and/or |
| $Fe_2O_3 + TiO_2 < 0.2\%$; and/or |
| species other than $ZrO_2$, $HfO_2$, $SiO_2$, $Y_2O_3$, |
| $B_2O_3$, $Al_2O_3$, $Na_2O$, $K_2O$, |
| $TiO_2$ and $Fe_2O_3$: $< 0.5\%$. |

5. The glass melting furnace as claimed in claim 1, wherein the fused cast refractory product comprises, as weight percentages on the basis of the oxides:

| | |
|---|---|
| $SiO_2$: | 8.5% to 11.0% |
| $B_2O_3$: | 0.30% to 0.80% |
| $Na_2O + K_2O$: | 0.40% to 0.70% |
| $Al_2O_3$: | 0.6% to 2.0%. |

6. The glass melting furnace as claimed in claim 1, wherein the fused cast refractory product comprises, as weight percentages on the basis of the oxides:

| | |
|---|---|
| $SiO_2$: | 8.5% to 10.8% |
| $B_2O_3$: | 0.30% to 0.70% |
| $Na_2O + K_2O$: | 0.40% to 0.70% |
| $Al_2O_3$: | 1.0% to 1.8%. |

7. The glass melting furnace as claimed in claim 1, wherein the fused cast refractory product comprises, as weight percentages on the basis of the oxides:

| | |
|---|---|
| $SiO_2$: | 9.1% to 11.0% |
| $B_2O_3$: | 0.30% to 0.70% |
| $Na_2O + K_2O$: | 0.40% to 0.70% |
| $Al_2O_3$: | 1.1% to 1.8%. |

8. The glass melting furnace as claimed in claim 1, wherein the fused cast refractory product comprises $CaO+MgO+BaO+SrO<0.60\%$.

9. The glass melting furnace as claimed in claim 1, wherein all the dimensions of the block are greater than 10 mm.

10. A glass melting furnace comprising a block positioned in the superstructure and made of a fused cast refractory product comprising, as weight percentages on the basis of the oxides and for a total of 100%:

| | |
|---|---|
| $ZrO_2$: | balance to 100% |
| $Hf_2O$: | <5% |
| $SiO_2$: | 8.1% to 12.0% |
| $B_2O_3$: | 0.20% to 0.90% |
| $Na_2O + K_2O$: | 0.40% to 0.80% |
| $Al_2O_3$: | 0.3% to 2.0% |
| $Y_2O_3$: | <2.0% |
| $Fe_2O_3 + TiO_2$: | <0.6% |
| other species: | <1.5%, | wherein the block has been manufactured according to a process comprising the following successive steps:

melting a mixture of raw materials to obtain a molten material, casting the molten material in a mold, solidifying the molten material in the mold, to obtain a solidified material, and controlled cooling the solidified material in order to bring a temperature of the solidified material to ambient temperature without fracturing.

11. The glass melting furnace as claimed in claim 10, wherein $SiO_2 \leq 10.6\%$.

* * * * *